United States Patent Office 2,951,101
Patented Aug. 30, 1960

2,951,101

CHEMICAL COMPOSITION AND PROCESS

Clifford A. Neros, Willoughby, and George A. Miller, Painesville, Ohio, assignors to Diamond Alkali Company, Cleveland, Ohio, a corporation of Delaware No Drawing. Filed May 26, 1958, Ser. No. 737,542

23 Claims. (Cl. 260—651)

The present invention relates to the inhibition of decomposition of a halogenated aromatic hydrocarbon comprising the addition thereto of a stabilizing amount of a polyhydric aliphatic alcohol; and more particularly relates to the stabilization of chlorinated xylenes and compositions containing chlorinated xylenes by addition thereto of a stabilizing amount of a polyhydric aliphatic alcohol.

It is known that a chlorinated xylene in a pure condition may be stored or shipped with little or no decomposition, induced by exposure to air, light, heat and/or moisture. However, in many instances, obtaining such high purity chlorinated xylenes in commercial production is not feasible. It has been found that the chlorinated xylenes normally encountered in commerce are subject to some decomposition when in contact with substances such as specks of rust or aluminum, dirt, air, light, heat, moisture and the like. Hence, means for preventing and/or inhibiting this decomposition of chlorinated xylenes and/or other chlorinated aromatic hydrocarbons generally associated therewith are highly desirable.

Previously, various stabilizers for aliphatic chlorinated hydrocarbons have beem employed. Some of these compounds which have demonstrated a degree of effectiveness are acetylenic alcohols, acetylenic ethers, straight chain acetylenic esters, mono-acetylenic hydrocarbons and mono-acetylenic mono-olefinic hydrocarbons. Although these prior stabilizers enjoyed a certain amount of success, surprisingly such materials are not satisfactory for the stabilization of chlorinated xylenes, and specifically alpha-chloro-p-xylene, for various reasons. Acetylenic alcohols are highly effective for the stabilization of such chlorinated aliphatic hydrocarbons as perchlorethylene but are ineffective for the stabilization of chlorinated xylenes such as alpha-chloro-p-xylene in that significant decomposition occurs even though the alpha-chloro-p-xylene contains relatively large quantities of these compounds. Mono-acetylenic mono-olefinic hydrocarbons and straight chain acetylenic esters are unsatisfactory for the same reason.

In view of the fact that the above acetylenically-unsaturated general stabilizers employed are unsatisfactory, it would lead to the conclusion that the compositions employed in the stabilization of chlorinated xylenes and the method of stabilizing such compounds are highly selective and, therefore, those stabilizers employed previously in the stabilization of chlorinated aliphatic hydrocarbons such as carbon tetrachloride, perchlorethylene, tetrachlorethylene, and the like are not adaptable to the stabilization of chlorinated xylenes.

Therefore, it is the primary object of the present invention to provide a means for inhibiting the decomposition of halogenated aromatic hydrocarbons, specifically, a chlorinated xylene.

Another object is the provision of an effective method of stabilizing a composition comprising essentially a chlorinated xylene, e.g., alpha-chloro-p-xylene.

A further object of this invention, therefore, is to provide a new stabilizing composition of matter and a composition including the new stabilizing composition which will be especially stable under the influence of various decomposing materials and conditions and particularly the effect of contaminating metal ions.

These and other objects will be apparent to those skilled in the art from the discussion hereinafter.

Unstabilized quantities of halogenated aromatic hydrocarbons as produced, including such compounds as benzyl chloride, may be either in a relatively pure or impure condition. For the most part, the purity of such a halogenated aromatic hydrocarbon depends upon its age, i.e., the length of time it has stood unstabilized after production without particular effect being made to prevent decomposition. Accordingly, a relatively impure halo-aromatic hydrocarbon is found to be of limited utility for many industrial needs although further decomposition may advantageously be inhibited by using the stabilizers of the present invention. On the other hand, some unstabilized halo-aromatic hydrocarbons are employed while relatively fresh and are correspondingly pure and usable. Such materials require only stabilization against further decomposition in order to be satisfactory for a number of uses.

Where the initial purity is not tolerable, the chlorinated aromatic hydrocarbon may require pretreatment of a nature such that the major proportion or substantially all of the impurities are removed prior to the addition of stabilizers so as to provide a material having a good initial level of acceptability for industrial needs. As noted above, some chlorinated aromatic hydrocarbons may not require such pretreatment although those skilled in the art will understand that a chlorinated xylene containing undesirable impurities may advantageously be treated for the removal or reduction of any impurities prior to stabilization. Such purification may be effected through means common in the art such as distillation.

In general, the present invention is directed to a composition comprising essentially a chlorinated aromatic hydrocarbon, e.g., a normally liquid chlorinated xylene, such as alpha-chloro-p-xylene, and a stabilizing amount of at least one polyhydric aliphatic alcohol, typically tetritols, pentitols and hexitols, the preferred alcohol being sorbitol.

The preferred polyhydric aliphatic alcohols of this invention may be represented by the structure:

$$HOCH_2-(CHOH)_n-CH_2OH$$

wherein $n$ is a number from 1 to 6, inclusive, preferably 2 to 4, inclusive.

The benefits which may be derived from this invention may be had by employing any one of the large number of polyhydric aliphatic alcohols. Among the suitable organic materials that would be taken within the scope of the definition of polyhydric aliphatic alcohols are tetritols, i.e., erythritol, threitol, pentaerythritol, and polypentaerythritols; pentitols such as ribitol, xylitol, and arabitol; and hexitols such as dulcitol, sorbitol, mannitol, iditol, talitol, and allitol.

Further, the invention is directed to such a composition including an additional ingredient effective to exert a stabilizing action against the influence of light and other sources of decomposition. It will be understood that the invention is not limited to a particular light or other stabilizer and that in general any well known light or other stabilizers may be employed with the general purpose stabilizers of this invention.

A preferred embodiment of the present invention comprises a composition of matter comprising essentially a normally liquid chain chlorinated xylene and a stabilizing amount of a polyhydric aliphatic alcohol, e.g., tetritols, pentitols, and hexitols, the preferred hexitol being sorbitol at present. This composition is particularly advantageous in the prevention of decomposition due to contact with contaminating metal ions such as iron and/or aluminum ions.

The polyhydric aliphatic alcohols, specifically sugar alcohols, employed in the practice of this invention are known and disclosed in The Encyclopedia of Chemical Technology, vol. 1, pages 321 to 333, Interscience Encyclopedia Inc., New York, 1947.

As stated, a new class of stabilizers noted above, namely, polyhydric aliphatic alcohols have been found particularly effective in stabilizing alpha-chloro-p-xylene contaminated with minor amounts of metallic ions such as those produced by specks of rust or aluminum, both in a liquid and in a vapor phase. For the most part, the stabilizing effect has been found to be most pronounced and prolonged where pretreatment which removes the greater part of contaminating metallic ions has been resorted to prior to the addition of the stabilizing polyhydric aliphatic alcohol.

The method of stabilizing the chlorinated aromatic hydrocarbons in accordance with this invention comprises essentially contacting a major proportion of the halogenated aromatic hydrocarbon, i.e., the chlorinated xylene, with a stabilizing amount of the polyhydric aliphatic alcohol. It is preferred that the stabilizer be added after the initial preparation of the chlorinated aromatic hydrocarbon, i.e., after the chlorination step, and that a stabilizing amount of the polyhydric aliphatic carbinol be combined, as noted above, e.g., in an amount of about 0.0001% to 5% by weight of the chlorinated aromatic hydrocarbon, preferably, however, from about 0.1% to 1% by weight of the chlorinated xylene. Under more adverse conditions such as higher temperatures and/or excessive contamination, it may be necessary to add several percent of the stabilizer. Large quantities of stabilizer are seldom necessary or desirable and in most cases amounts of stabilizer less than 5% by weight of the chlorinated aromatic hydrocarbon protect the chlorinated aromatic hydrocarbon against decomposition under the most severe conditions normally encountered. The indicated intermediate preferred range is generally sufficiently effective where the purified chlorinated xylene contains not more than about 0.2% by weight of the metallic impurities most common in commercial production.

Those skilled in the art will appreciate that while the polyhydric aliphatic alcohols of the present invention and particularly hexitols, such as sorbitol, will be especially useful in the practice of the present invention, since these materials have boiling points in the same general range as the boiling point of the chlorinated xylene. Such materials are especially desirable as they may be expected to have the property of going into the vapor phase with the chlorinated xylene and returning with it to the liquid phase. This is especially significant in vapor phase process operations as well as in the processes in which the chlorinated xylenes may be recovered by distillation and reused.

In order that those skilled in the art may better understand the present invention and in what manner the same may be carried into effect, the following specific examples are offered.

*Example I*

In order to demonstrate the effectiveness of a stabilizer of the present invention, a procedure is carried out by which alpha-chloro-p-xylene is stabilized with sorbitol. In this test, 25 ml. of alpha-chloro-p-xylene is placed in each of five 4 oz. glass containers. Sorbitol is added to the first three solutions in concentrations of 0.125 g., 0.250 g., and 0.500 g. respectively. A metal contaminant comprising 50% iron powder and 50% iron oxide is then added in concentrations of from 0.01 g. to 0.5 g. per container. A series of five solutions is made up in this manner, the latter two solutions being employed as standardized checks. Each of these solutions is allowed to stand at room temperature for 14 days in the presence of ordinary room light whereupon each of the solutions is rated on a scale from 0 for colorless to 10 denoting complete decomposition and high discoloring. Employing this procedure, the standard check solutions are completely black at the end of the period employed, whereas the stabilized solutions are colorless, receiving a rating of 0, thus demonstrating that sorbitol is singularly effective in the stabilization of alpha-chloro-p-xylene for a period of better than 14 days under the conditions employed.

While the invention has been described in terms of its use in connection with chlorinated xylenes, notably alpha-chloro-p-xylene, it is desired to point out that it is not to be thus limited. The invention extends to the stabilization of other similar chlorinated aromatic hydrocarbons, either saturated or unsaturated, such as benzyl chloride, methyl benzyl chloride, dimethyl benzyl chloride, ethyl benzyl chloride, diethyl benzyl chloride, and the like or any other chlorinated aromatic hydrocarbons in which a similar stability problem is encountered.

While there have been described various embodiments of the invention, the methods and products described are not intended to be understood as limiting the scope of the invention as it is realized that changes therein are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A stabilized composition of matter comprising essentially a side chain-halogenated aromatic hydrocarbon contaminated with metal ions and a stabilizing amount of a polyhydric aliphatic alcohol.

2. A stabilized composition of matter comprising essentially a side chain-chlorinated aromatic hydrocarbon contaminated with metal ions in combination with a stabilizing amount of a polyhydric aliphatic alcohol represented by the structure:

$$HOCH_2-(CHOH)_n-CH_2OH$$

wherein $n$ is a number from 1 to 6, inclusive.

3. A stabilized composition of matter comprising essentially a side chain-chlorinated aromatic hydrocarbon contaminated with metal ions in combination with a stabilizing amount of a hexitol.

4. A stabilized composition of matter comprising essentially a side chain-chlorinated aromatic hydrocarbon contaminated with metal ions with a stabilizing amount of a polyhydric aliphatic alcohol in combination with another stabilizer.

5. A stabilized composition of matter comprising essentially a side chain-chlorinated polyalkyl benzene contaminated with metal ions and a stabilizing amount of a polyhydric aliphatic alcohol.

6. A stabilized composition of matter comprising essentially a side chain-chlorinated polymethyl benzene contaminated with metal ions and a stabilizing amount of a polyhydric aliphatic alcohol.

7. A stabilized composition of matter comprising essentially a side chain-chlorinated xylene contaminated with metal ions and a stabilizing amount of a polyhydric aliphatic alcohol.

8. A stabilized composition of matter comprising essentially a side chain-halogenated aromatic hydrocarbon contaminated with metal ions with a stabilizing amount of sorbitol.

9. A stabilized composition of matter comprising essentially a side chain-chlorinated aromatic hydrocarbon contaminated with metal ions with a stabilizing amount of sorbitol.

10. A stabilized composition of matter comprising essentially a side chain-chlorinated polymethyl benzene contaminated with metal ions with a stabilizing amount of sorbitol.

11. A stabilized composition of matter comprising essentially a side chain-chlorinated polymethyl benzene contaminated with metal ions with a stabilizing amount of sorbitol in combination with another stabilizer.

12. A stabilized composition of matter comprising essentially a side chain-chlorinated xylene contaminated with metal ions with a stabilizing amount of sorbitol.

13. A stabilized composition of matter comprising essential alpha-chloro-p-xylene contaminated with metal ions with a stabilizing amount of sorbitol.

14. The method of stabilizing a side chain-chlorinated aromatic hydrocarbon contaminated with metal ions comprising essentially contacting said side chain-chlorinated aromatic hydrocarbon with a stabilizing amount of a polyhydric aliphatic alcohol.

15. The method of stabilizing a side chain-chlorinated aromatic hydrocarbon contaminated with metal ions comprising essentially contacting said side chain-chlorinated aromatic hydrocarbon with a stabilizing amount of a polyhydric aliphatic alcohol represented by the structure:

$$HOCH_2-(CHOH)_n-CH_2OH$$

wherein $n$ is a number from 1 to 6, inclusive.

16. The method of stabilizing a side chain-chlorinated polymethyl benzene contaminated with metal ions comprising essentially contacting said side chain-chlorinated polymethyl benzene with a stabilizing amount of a polyhydric aliphatic alcohol.

17. The method of stabilizing a side chain-chlorinated polymethyl benzene contaminated with metal ions comprising essentially contacting said side chain-chlorinated polymethyl benzene with a stabilizing amount of a hexitol.

18. The method of stabilizing a side chain-chlorinated xylene contaminated with metal ions comprising essentially contacting said side chain-chlorinated xylene with a stabilizing amount of a polyhydric aliphatic alcohol.

19. The method of stabilizing a side chain-halogenated aromatic hydrocarbon contaminated with metal ions comprising essentially contacting said side chain-halogenated aromatic hydrocarbon with a stabilizing amount of sorbitol.

20. The method of stabilizing a side chain-chlorinated aromatic hydrocarbon contaminated with metal ions comprising contacting said side chain-chlorinated aromatic hydrocarbon with a stabilizing amount of sorbitol.

21. The method of stabilizing a side chain-chlorinated polymethyl benzene contaminated with metal ions comprising essentially contacting said side chain-chlorinated polymethyl benzene with a stabilizing amount of sorbitol.

22. The method of stabilizing alpha-chloro-p-xylene contaminated with metal ions comprising essentially contacting said alpha-chloro-p-xylene with a stabilizing amount of sorbitol.

23. A stabilized composition of matter comprising essentially alpha-chloro-p-xylene contaminated with metal ions and containing a stabilizing amount of a polyhydric aliphatic alcohol.

References Cited in the file of this patent

UNITED STATES PATENTS 2,722,557    Danison _____ Nov. 1, 1955